United States Patent [19]

Abe

[11] Patent Number: 4,528,603

[45] Date of Patent: Jul. 9, 1985

[54] DRUM SERVO CONTROL WITH REDUCED HEAD PHASE ERROR DURING EDITING

[75] Inventor: Fumiyoshi Abe, Zama, Japan

[73] Assignee: Sony Corporation, Tokyo, Japan

[21] Appl. No.: 364,190

[22] Filed: Mar. 31, 1982

[51] Int. Cl.³ ............................................. G11B 21/04
[52] U.S. Cl. .................................... 360/70; 360/14.1
[58] Field of Search ................ 360/69, 70, 75, 14.1, 360/14.2; 318/314, 608

[56] References Cited

U.S. PATENT DOCUMENTS

| | | | |
|---|---|---|---|
| 3,742,132 | 6/1973 | Sanguu et al. | 360/14.1 |
| 4,206,485 | 6/1980 | Sakamoto . | |
| 4,210,943 | 7/1980 | Nakamura et al. | 360/77 |
| 4,229,773 | 10/1980 | Sakamoto | 360/70 |
| 4,257,073 | 3/1981 | Tatami | 360/77 |
| 4,268,875 | 5/1981 | Morio et al. | 360/77 |
| 4,283,671 | 8/1981 | Nakano et al. | 318/608 |
| 4,306,254 | 12/1981 | Koda et al. | 360/70 |
| 4,322,757 | 3/1982 | Hatakeyama | 360/14.2 |
| 4,390,908 | 6/1983 | Nakamura et al. | 360/70 |
| 4,404,601 | 9/1983 | Sakamoto | 360/77 |

Primary Examiner—Raymond F. Cardillo, Jr.
Assistant Examiner—Steven R. Garland
Attorney, Agent, or Firm—Lewis H. Eslinger; Alvin Sinderbrand

[57] ABSTRACT

A head drum servo control arrangement is provided in a video tape recording and reproducing apparatus, for example, of the helical scan type, for reducing head phase error at the cut-in point on a magnetic tape during an electronic editing operation. A variable delay circuit imparts an adjustable delay to a detecting signal provided in response to rotation of the head drum. A first phase comparator circuit provides a drive control signal in response to a comparison of phases of the delayed detecting signal and an off-tape synch signal. A second phase comparator circuit provides a phase error signal in response to a comparison of phases of the reproduced synch signal and an off-tape synch signal derived from a video signal to be recorded during the editing operation. A phase control setting circuit, for example, an integrator, provides a phase control signal to the variable delay circuit in response to the phase error signal, while an offset circuit feeds back an adjusting signal to a subtracting circuit in advance of the integrator. This offset circuit can include an attenuator provided with the output of a level comparator having inputs respectively receiving the phase control signal and a reference level.

17 Claims, 4 Drawing Figures

DRUM SERVO CONTROL WITH REDUCED HEAD PHASE ERROR DURING EDITING

BACKGROUND OF THE INVENTION

1. Field of the Invention

This invention relates to a head drum servo control arrangement for video tape recording and reproducing apparatus, and is especially directed to a head drum servo control arrangement for adjusting head phase relative to the tape during an electronic editing operation.

2. Description of the Prior Art

During electronic editing of video tape, head phase errors can occur at the edit point or cut-in point; that is, a phase jump can occur when the phase of a video signal to be recorded does not match the phase of a video signal already recorded on the tape.

Although the format for recorded video signals on tape is standardized for helical scan video tape recorders or VTRs for broadcasting use, there is a certain amount of tolerance permitted. Consequently, from one VTR to another, there are small differences in the relation of the slant video tracks to control signals recorded longitudinally on an edge of the track, although these differences are all within a tolerance range. These differences appear as phase errors in the vertical synchronizing signal. Although these phase errors can be compensated during normal reproduction, certain problems arise during an electronic editing operation.

During electronic editing a new video signal is recorded, beginning at an edit point or a so-called cut-in point, immediately following a section in which a video signal has been recorded previously.

Because the vertical synch signals are used to control head rotational phase during reproduction, while position pulses generated by rotation of the head drum are used to control head rotational phase during recording, jumps in head phase can occur at the editing or cut-in points.

Consequently, in existing helical scan VTRs for broadcast use, means are provided to avoid generation of phase errors at editing points.

Generally, if a VTR is used in editing, first an editing point or cut-in point is determined. Then, the video tape is backed for a short distance to a point in advance of the cut-in point. After this, the tape is advanced and a reproducing operation is carried out until the cut-in point is reached. During a run-in period, that is during the time that the tape is advanced until the cut-in point is reached, the phase of the position pulse is displaced from a reference phase, and the phase difference between an off-tape vertical synch signal and a reproduced vertical synch signal separated from the reproduced video signal is adjusted until it is the same as the phase difference between the position pulse and the off-tape vertical synch signal. Thus, when the cut-in point is reached, the rotational phase of the head drum is properly adjusted to avoid phase jump at the cut-in point.

However, with an editing operation carried out as described above, jitter in the head drum prevents complete compensation of these phase errors. More specifically, if a sequence of short cuts (e.g., one to two minutes of video programming) are insert-edited onto a previously recorded tape using the above-described phase-correcting technique, phase errors will accumulate due to jitter of the head drum.

OBJECTS AND SUMMARY OF THE INVENTION

Accordingly, it is an object of this invention to provide for a video tape recording and/or reproducing apparatus, a drum servo control arrangement which avoids the drawbacks of the prior art.

It is another object of this invention to provide a drum servo control arrangement in which accumulation of error is avoided and which will therefor facilitate establishment of rotational head phase at editing cut-in points.

It is a further object of this invention to provide a drum servo control arrangement for use with a VTR performing a phase error correction operation such that any phase error, as between a video signal to be recorded during an editing operation and a previously recorded video signal, will vanish.

According to an aspect of this invention, a head drum servo control arrangement is provided for a video tape recording and reproducing apparatus in which video signals are recorded in successive parallel tracks traversing a magnetic or other record tape, with the video signals containing a regularly occurring synch signal therein. In practice, this synch signal can be the vertical synchronizing signal. The apparatus includes a video input circuit for processing an input video signal, a transducer head to which the input video signal is applied for recording on the tape and from which a reproduced video signal is derived during playback, and an output video processing circuit for processing the reproduced video signal. A rotatable head drum carries the transducer head so that the latter scans the successive parallel tracks when the tape is advanced past the head drum, and a rotational phase detector provides a drum phase pulse to indicate the rotational phase of the head drum relative to the tape. A controllable drive motor turns the head drum and has an input for receiving a drive control signal which is varied to control the phase of the head drum. An off-tape synch separator derives the synch signal from the input video signal and provides the same as an off-tape synch signal, while a reproduced synch separator separates the synch signal from the reproduced video signal and provides the same as a reproduced synch signal. The head drum servo control arrangement comprises variable delay means coupled to the phase detector to impart a delay to the drum phase pulse in an amount that depends upon a phase control signal supplied thereto; a first phase comparator circuit provided with the off-tape synch signal and the delayed drum phase pulse and providing the drive control signal in response to a comparison of phases of the delayed drum phase pulse and the off-tape synch signal; a second phase comparator circuit provided with the off-tape synch signal and the reproduced synch signal and providing a phase error signal in response to a comparison of phases of these signals; a phase control signal setting circuit providing the phase control signal to the variable delay means in response to the phase error signal; and an offset circuit reducing the phase error signal, prior to application thereof to the control signal setting circuit, by an amount corresponding to a predetermined fraction of the difference between the phase control signal and a reference value. Preferably, the offset circuit can include a linear comparator providing a comparison output related to the difference between the phase control signal and the reference value, an attenuator attenuating the comparison output to a factor of 10%, and a subtracting circuit for subtracting the attenuated comparison output from the phase control signal.

Also preferably, the first and second phase comparator circuits share a common phase comparator element which is alternately connected on a time-sharing basis to compare the drum phase pulse with the off-tape synch signal and then to compare the reproduced synch signal with the off-tape synch signal.

These and other objects, features, and advantages of this invention will be more fully appreciated from the ensuing description of a preferred embodiment thereof, which is to be considered in connection with the accompanying drawings.

DETAILED DESCRIPTION OF A PREFERRED EMBODIMENT

Figure 1:
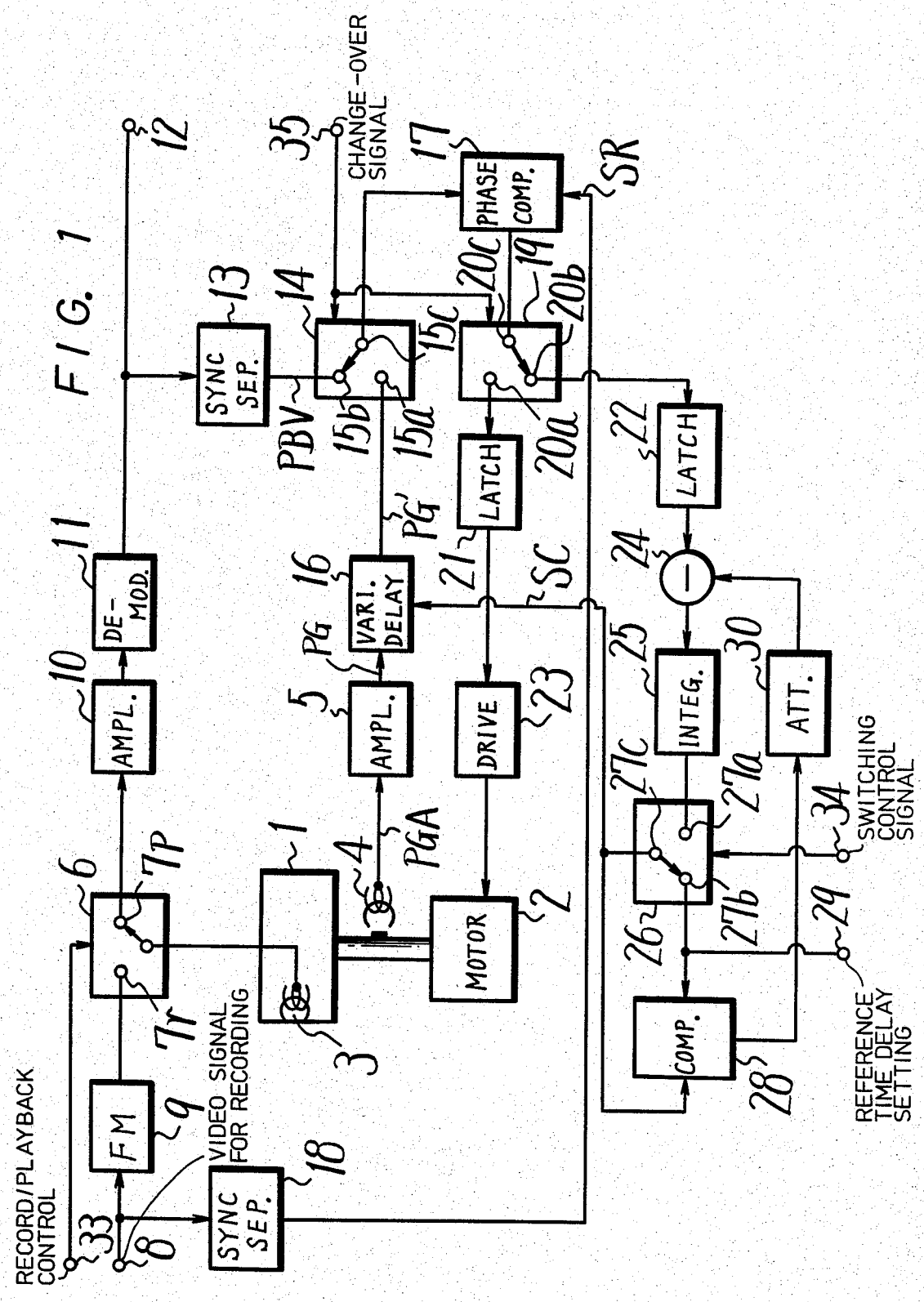
FIG. 1 is a schematic block diagram of an embodiment of a drum servo control arrangement according to this invention.

With reference to the drawings, and initially to FIG. 1 thereof, video tape recording and reproducing apparatus incorporating the drum control arrangement of this invention includes a head drum 1 which is rotationally driven by a DC drum motor 2 to rotate at a video field frequency (e.g., 60 rotations per second) so that respective field intervals of a modulated video signal are recorded by a video transducer head 3 as a series of successive slant tracks traversing a video tape (not shown) with which the head drum 1 is in contact.

In this embodiment, the head drum 1 has a single head 3 and the tape is wrapped helically about a peripheral surface of the drum over an angular range of substantially 360°. However, in other possible embodiments, the head drum 1 could be of the so-called one-and-one-half head type, in which a main video head records and reproduces video information and an auxiliary video head records and reproduces during the vertical blanking period. The head drum 1 could also be of the two-head type, or could be of the four-head type.

A rotational phase detecting coil 4 is associated with the shaft of the head drum 1 and provides a detecting signal pulse PGA once for each rotation of the head drum 1. This detecting pulse signal PGA is then furnished to a signal shaping amplifier 5 which, in turn, produces a detecting signal PG which is representative of the phase, or rotational position of the head 3.

The rotary transducer head 3 serves both for recording a video signal supplied thereto through a rotary transformer (not shown) and for picking up signals previously recorded on the tape. A recording/reproducing switching circuit 6 is provided with switched contacts 7r and 7p which are each selectively coupled to the head 3 for recording and for reproducing or playback, respectively. A video input signal to be recorded is provided at a video input terminal 8 and is supplied therefrom to a frequency modulator 9 having an output connected to the recording contact 7r of the switching circuit 6. Accordingly, during recording this video input signal is recorded by the head 3 on the tape.

During a reproducing operation, the video signal picked up by the head 3 is provided through the contact 7p of the record/reproducing switching circuit 6 to a reproducing amplifier 10 and thence to an FM demodulator or detector 11. The latter provides a demodulated reproduced video signal to a video output terminal 12, and also to a reproduced vertical synch separator 13, which provides a reproduced vertical synch signal PBV. A controlled switching circuit 14 has first and second switched terminals 15a and 15b and a common terminal 15c.

The detecting signal PG from the amplifier 5 is provided to a variable delay circuit 16, which, in turn, provides to the first switched terminal 15a a delayed detecting signal PG' which is delayed by an amount depending upon a control signal SC applied to a control terminal of the delay circuit 16. The reproduced vertical synch signal PBV is applied to the second switched terminal 15b. The common terminal 15c of the switching circuit 16 is connected to one input of a phase comparator 17.

An off-tape synch signal separator 18 connected to the video input terminal 8 provides an off-tape synch signal from the video signal to be recorded on the tape, and this off-tape synch signal SR is provided to another input of the phase comparator 17.

Another controlled switching circuit 19, also having first and second switched terminals 20a and 20b and a common terminal 20c follows the phase comparator 17 and has its common terminal 20c connected to receive an error output provided from the phase comparator 17. The switched terminals 20a and 20b are connected to respective latch circuits 21 and 22, and the latter each store a respective error signal provided from the phase comparator 17. The error signals stored in the latch circuit 21 is furnished to a motor drive circuit 23 so that the speed of the DC motor 2 is controlled in response to the error signal stored in the latch circuit 21.

It should be appreciated that the detecting coil 4, the amplifier 5, the variable delay circuit 16, the phase comparator 17, the latch circuit 21, and the drive circuit 23 form a servo loop and the off-tape synch signal SR serves as a servo reference signal.

The phase error signal stored in the latch circuit 22 is supplied through a subtractor 24 to an integrator 25 which serves as a delay time setting circuit for establishing the delay time control signal SC furnished to the variable delay circuit 16.

Another controlled switching circuit 26 has a first switched terminal 27a coupled to an output of the integrator 25 and has a second switched terminal 27b coupled to an input of a linear comparator 28 and to a reference delay-time setting input 29. A common terminal 27c of the switching circuit 26 supplies the delay setting control signal SC to the variable delay circuit 16 and also to another input of the level comparator 28.

An output of the comparator 28 is supplied through an attenuator having an attenuation gain H of, for example, 10%, to the subtractor 24 as an offset signal.

A record/reproduce input 33 receives a record/reproducing switching signal to control the operation of the switching circuit 6, and a switching control signal input 34 provides a switching control signal to the switching circuit 26 to control the operation thereof, so that the reference time delay signal at terminal 29 will be used as the control signal SC during the normal recording mode and the loop derived signal will be used as control signal SC during the time that the tape is advanced until the "cut-in" point is reached. A change-over signal is also applied to a change-over input 35 connected with both switching circuits 14 and 19. During the run-in of an editing operation, a signal which changes over at the field rate is supplied to this terminal 35 so that the phase comparator is alternately connected, at the field rate, to compare the delayed detecting signal PG' with the off-tape synch signal SR for alternate fields (i.e. for alternate recorded tracks) and to compare the reproduced synch signal PBV with the off-tape synch signal SR for the remaining field intervals (i.e., for the remaining recorded tracks). Similarly, the switching circuit 19 is switched over to store the phase error signal from the phase comparator 17 in the latches 21 and 22 for such alternate field intervals and remaining field intervals, respectively.

A reference delay time setting signal is applied at the input 29 and represents a preset value peculiar to each respective VTR. This signal has a level reflecting the inherent phase characterisitics of the head drum 1.

Accordingly, during a normal recording operation, the switching circuit 26 has its terminal 27b connected to the common terminal 27c so that the reference delay-time setting signal is applied directly, as the control signal SC, to the variable delay circuit 16. Thus, the latter provides a reference amount of delay time.

Generally, this reference delay time is established by reproducing a test pattern video signal from a reference tape. The test pattern video signal has a standarized format. During the reproduction of such tape, the variable delay circuit 16 requires a control signal SC to be a level such that the playback vertical synch signal PBV and the delayed detecting signal PG' are coincident with one another. This value for the control signal SC is stored, and is applied to the input terminal 29 whenever the reference delay-time setting signal is required.

However, when the VTR is operated in a normal recording mode, the switching circuit 26 is switched over to the input terminal 27b so that the reference delay-time setting signal is applied to the variable delay circuit 16 and the signal PG' is delayed by the reference amount.

Then, the head phase servo loop maintains the phase of the transducer head 3 in accordance with a comparison of the delayed detecting signal PG' and the off-tape synch signal SR.

During the run-in portion of an editing operation, the switching circuit 26 is first switched over to its terminal 27b, and thereafter is switched over to the terminal 27a. Thus, during run-in, the control signal SC supplied to the variable delay circuit 16 is the reference delay-time setting signal applied to the input 29. At this time, the phase error signal representing the phase difference between the reproduced synch signal PBV and the off-tape synch signal SR, which is stored in the latch circuit 22 is provided to the integrator 25 and the output thereof, constituting a correction value, appears at the terminal 27a of the switching circuit 26.

After the switching circuit 26 is changed over to the terminal 27a thereof, the output of the integrator 25 supplies the switching control signal SC to the variable delay circuit 16 and is also connected to one input of the level comparator 28. Thus, at this time, the comparator 28 provides an error signal to the attenuator 30 and the latter provides approximately 10% of that value as an offset level to the subtractor 24. This offset level represents 10% of the difference between the reference delay-time setting level and the output of the integrator 25, and, consequently, the subtractor 24 provides to the input of the integrator 25 a signal representing approximately 90% of a desired perfect correction value. Thus, the control signal SC provided from the output of the integrator 25 is varied until a predetermined fraction (in this case 90%) of perfect correction is obtained.

In this embodiment only a single phase comparator 17 is employed, but the same is common to both a phase comparator circuit arrangement in which the delayed detecting signal PG' is compared with the off-tape synch signal SR and also to another phase comparator circuit arrangement in which the reproduced synch signal PBV is compared with the off-tape synch signal SR. As the switching circuits 14 and 19 are changed over at the field rate, during alternate field periods, the detecting signal PG' from the variable delay circuit 16 is applied to the phase comparator 17 and during the remaining field periods the reproduced synch signal PBV is applied to the phase comparator 17. Similarly, the phase error signal representing the phase error of the head drum 1 with respect to the off-tape synch signal SR is stored in the latch circuit 21, while the phase error signal representing phase error between the reproduced synch signal PBV and the off-tape synch signal SR is stored in the latch circuit 22.

The phase error signal stored in the latch circuit 22 is integrated in the integrator 25 and is thereafter supplied as the control signal SC to the variable delay circuit 16. Meanwhile, the output of the integrator 25 is compared with the reference delay-time setting signal in the level comparator 28, and the attenuator 30 provides an offset signal, corresponding to approximately 10% of the level-comparison output from the level comparator 28, to the subtractor 24 so that the level in the latch circuit 22 is reduced by the offset level prior to being supplied to the integrator 25.

The above error correcting operation is carried out during alternate fields, so that the phase error between the detecting signal PG' and the servo reference signal SR and the phase error between the reproduced synch signal PBV and the off-tape synch signal SR are each reduced towards a zero level after several field intervals. Here, because the phase error signal supplied from the latch 22 is reduced by 10% of the phase error between the reference delay-time setting signal and the output of the integrator 25, the delay time of the variable delay circuit 16 gradually converges to the reference delay time.

Figure 2:
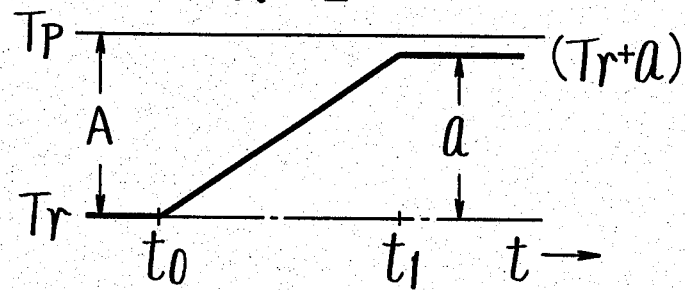
FIG. 2 is a chart useful in explaining the operation of the embodiment of FIG. 1.

As shown in FIG. 2, if it is assumed that the VTR has an inherent reference delay time $T_r$, the delay time necessary to render the phase error as between the reproduced vertical synch signal PBV and the head phase detecting signal PG to be zero is a predetermined delay time $T_p$, then the difference between these delay times $T_r$ and $T_p$ is a given amount A. $T_r$ is the reference time-delay setting, as might be input at terminal 29, and has a level reflecting the inherent phase characteristic of head drum 1 and can be determined, as indicated above, by reproducing a video test pattern signal from a reference tape. The servo system is initially set at the reference delay time $T_r$. However, after a time $t_0$ at which the phase correcting operation commences, the control signal SC from the integrator 25 is changed gradually, and the delay time gradually changes towards the delay time $T_p$. At a later time $t_1$, the delay time effected by the variable delay circuit 16 has a value $(T_r+a)$, where a=0.9 A. At this time, the phase correcting operation is complete, and the input video signal can be recorded. Then, at the cut-in point, or edit point, the VTR is changed over to its recording mode. If an insert editing operation is intended, the integrator 25 can continue to hold the correcting signal SC established during the phase correcting operation. However, if an assemble-editing operation is carried out, the control signal SC can be permitted to vary back to the reference level established by the reference signal applied at the input 29.

Figure 3:
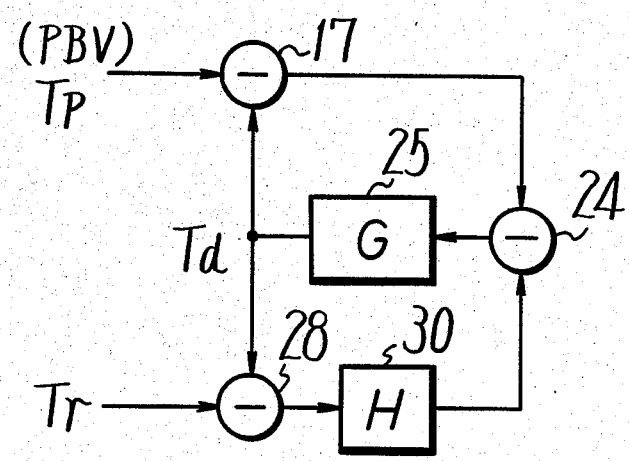
FIGS. 3 and 4 are equivalent circuit diagrams for explaining the operation of a portion of the embodiment of FIG. 1.
Figure 4:
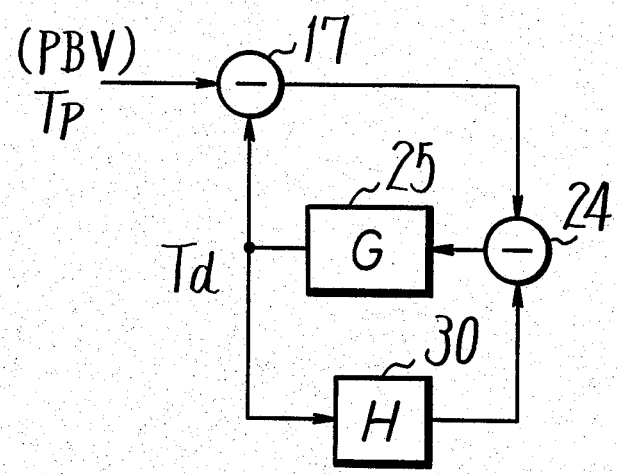

FIG. 3 shows an equivalent circuit diagram for explaining the above-described phase correction operation. Here, signals representing the phase delay timings $T_p$ and $T_r$ are provided to the comparators 17 and 28, respectively, which act, in effect, as subtractors. The integrator 25 and the attenuator 30 have effective gains of G and H, respectively. Because the amount of reference delay $T_r$ can be set at zero for sake of understanding, the circuit of FIG. 3 can be further simplified to the equivalent circuit as shown in FIG. 4. That is, when a phase error timing $T_p$ exists between the delayed detecting signal PG' and the reproduced vertical synch signal PBV, a delay amount $T_d$ is established at the output of the integrator 25 for adjusting the phase of the delayed detecting signal PG', and a portion of this delay timing $T_d$ is subtracted in the subtractor 24 from the error timing $T_p$ before application to the integrator 25. When a stable or balanced state is achieved in the head drum servo arrangement, the relation of these delay timings $T_d$ and $T_p$ is established as expressed in the following relationship:

$$T_d = [(T_p - T_d) - (H \times T_d)]G$$

where G is the amplification gain of the integrator 25 and H is the attenuation gain of the attenuator 30. This relationship can be rewritten as follows:

$$\frac{T_d}{G} = T_p - T_d - H \times T_d$$

Here, if the integrator gain G is assumed to be large (i.e., to approach infinity) the above equation becomes $$0 = T_p - (1 + H)T_d,$$

or $$0 = T_p - (1 + H)T_d,$$

or $$T_d = \left(\frac{1}{1+H}\right) T_d.$$

Here, when the attenuator gain H is 0.1, a correction of 1/1.1 or 91%, is achieved on the error delay timing $T_p$.

In this embodiment, control signals for controlling the switching circuits 14, 19, and 26 and for controlling operation of the latch circuits 21 and 22 as well for controlling a holding operation for the integrator 25 are provided by respective control circuits (not shown) which can also be incorporated in a video recording and reproducing apparatus.

As is apparent from the above discussion of the embodiment of this invention as described herein, a correction operation is carried out so that any phase error between the synchronizing signal of a video signal to be recorded and the synchronizing signal in a video signal previously recorded on the tape is reduced substantially to zero. During a run-in period, the previously-recorded video signal is picked-up for several tracks in advance of the cut-in point, and the difference between a corrected delay time and a reference delay time setting is determined. A fraction of this difference, i.e., 10% thereof, is used to reduce the correcting delay time so that any correction errors, for example, caused by jitter of the head drum 1, will not accumulate. That is, in recognition of the fact that some jitter is inherent to the operation of the head drum 1, the servo system of this invention reduces the correcting delay time by a predetermined amount relative to a desired value (in this example, the correcting value is reduced approximately 10%).

While a single embodiment of this invention has been described hereinabove, it should be recognized that many modifications and variations thereof can be constructed, all of which operate according to the principles of this invention. For example, in many possible alternative embodiments, separate phase comparators can be used for comparison of the detecting signal PG with the off-tape reference signal SR, and for the phase comparison of the reproduced synch signal PBV with the off-tape synch signal SR. In other possible embodiments, the rotational phase of the head drum 1 can be controlled in response to the reproduced vertical synch signal PBV. Then, upon selection of a recording mode, the head drum phase can be controlled in response to the detecting signal PG.

Although only one embodiment has been described hereinabove, it will apparent that many modifications and variations thereof can be effected by persons skilled in the art without departure from the scope or spirit of this invention, which are to be defined by the appended claims.

I claim:

1. A head drum servo control arrangement in video tape recording and reproducing apparatus in which video signals are recorded in successive parallel tracks traversing a record tape with the video signals containing a regularly occurring synchronization signal therein, the apparatus including video input means to which an input video signal is applied, a transducer head to which the input video signal is applied for recording and from which a reproduced video signal is derived during playback, output video processing circuitry for processing the video signal reproduced from said tape, a rotatable head drum on which said transducer head is mounted so that the latter scans said successive parallel tracks when said tape is advanced past said head drum, rotational phase detecting means providing a drum phase signal to indicate rotational phase of said head drum, controllable drive means for rotationally driving said head drum and having an input for receiving a drive control signal which is varied to control the rotational phase of said head drum, off-tape synchronization signal separating means coupled to said video input means for producing a reference synchronization signal, and reproduced synchronization signal separating means coupled to said output video processing circuitry for producing a reproduced synchronization signal from the video signal reproduced from the tape; the head drum servo control arrangement comprising:

variable delay means having a signal input coupled to receive said drum phase signal, a control input coupled to receive a phase control signal, and an output providing a delayed drum signal delayed an amount determined by said phase control signal;

first phase comparator circuit means provided with said reference synchronization signal and said delayed drum phase signal, and selectively providing during a first time period said drive control signal in response to a comparison of phases of such signals;

second phase comparator circuit means provided with said reference synchronization signal and said reproduced synchronization signal and selectively providing during a second time period a phase error signal in response to a comparison of phases of such signals;

switch means connected to said first and second phase comparator circuits for alternately selecting one of said first and second phase comparator circuits to provide said drive control signal and said phase error signal during said first and second time periods, respectively, in response to a change-over signal alternating at a field rate of the video signal;

phase control signal setting means receiving said phase error signal for generating therefrom said phase control signal fed to said variable delay means wherein said delayed drum phase signal is provided in response thereto; and offset means connected to receive said phase error signal from said phase control signal setting means and receiving a time delay reference signal for reducing said phase error signal before application thereof to said phase control signal setting means by an offset amount corresponding to a predetermined fraction of the difference between said phase control signal and said time delay reference signal.

2. A head drum servo control arrangement according to claim 1, wherein said phase control signal setting means includes an integrating circuit having an input to receive the phase error signal reduced by said offset amount and an output providing an integrated version thereof as said phase control signal.

3. A head drum servo control arrangement according to claim 2, wherein said offset means includes a subtractor having inputs respectively coupled to receive said phase error signal and an offset signal representing said predetermined fraction, and an output coupled to the input of said integrating circuit.

4. A head drum servo control arrangement according to claim 3, wherein said offset means further includes a comparator receiving said phase control signal and said time delay reference signal for providing a level comparison signal in response to a comparison of levels of such signals, and an attenuator disposed between said comparator and said subtractor for applying to the latter a version of the error signal from said comparator attenuated a predetermined amount.

5. A head drum servo control arrangement according to claim 4, wherein said attenuator attenuates said error signal to substantially ten percent of its initial value before application to said subtractor.

6. A head drum servo control arrangement according to claim 4, wherein said phase control signal setting means includes a controlled switch having a common terminal coupled to one input of said comparator and to the control input of said variable delay means, a first switched terminal connected to another input of said comparator and to a reference input to receive said time delay reference signal, a second switched input coupled to the output of said integrating circuit, and a control input coupled to receive a switch control signal, whereby said common terminal is connected to either said first or second switched terminals in response to said switch control signal.

7. A head drum servo control arrangement according to claim 1, wherein said first and second phase comparator circuit means share a common phase comparator having one input coupled to receive said reference synchronization signal, another input alternately coupled by said switch means to receive said delayed drum phase signal and to receive said reproduced synchronization signal, and an output alternately coupled by said switch means to provide said drive control signal and said phase error signal during said first and second time periods, respectively, in response to said change-over signal.

8. A head drive servo control arrangement according to claim 7, in which said switch means includes first and second controlled switches provided with common terminals connected respectively to said other input and to said output of said phase comparator, the first controlled switch having a first switched terminal coupled to said variable delay means and a second switched terminal coupled to aid reproduced synchronization signal separating means, and the second controlled switch having first and second switched terminals respectively providing said drive control signal and said phase error signal.

9. A head drum servo control arrangement according to claim 8, wherein said first and second controlled switches are switched over once for each vertical interval of said video signal.

10. A head drum servo control arrangement according to claim 8, wherein said first phase comparator circuit means includes a latch coupled to the first switched terminal of said second controlled switch and said second phase comparator circuit means includes a latch coupled to the second switched terminal of said second controlled switch.

11. A head drum control circuit for use with video tape editing apparatus that records and reproduces video signals in serial parallel slant tracks on a magnetic tape in which the video signals contain a periodic synchronization signal therein, the apparatus including a rotary magnetic head to which an input video signal is fed for recording and from which a reproduced video signal is derived during playback, the rotary magnetic head being mounted on a rotatable head drum to scan the parallel slant tracks when said tape is advanced past the head drum, the head drum being driven by a controllable drive motor in response to a drive control signal that varies the rotational phase of the motor, a rotational phase detector producing a drum phase signal representing the rotational phase of the head drum, the input video signal having the synchronization signal separated therefrom to form a servo reference signal and the reproduced video signal having the synchronization signal separated therefrom to form a reproduced synchronization signal, the head drum control circuit comprising:

a servo control loop having the drum phase signal as a first input, a phase control signal as a second input, and the servo reference signal as a third input, and a drive control signal as an output, the servo control loop including;

variable delay means connected to receive said drum phase signal for producing at an output a time delayed drum phase signal in response to said phase control signal, and phase comparison means for comparing the respective phases of an output of said variable delay means and said servo reference signal and thereby producing said drive control signal as an output of said servo control loop fed to said drive motor; and a phase control signal generator having inputs receiving said reproduced synchronization signal and said servo reference signal for comparing the respective phases of said inputs and producing a phase error signal representing a phase difference therebetween, said phase control signal generator including a level comparator for comparing in level the phase error signal and a reference time delay signal and producing therefrom a level compared signal, an attenuator for attenuating said level compared signal and producing an output signal therefrom, a subtractor for subtracting said output signal of said attenuator from said phase error signal and producing therefrom a difference signal fed to said variable time delay as said phase control signal.

12. A head drum control circuit according to claim 11, in which a single phase comparator is provided for use in both said phase comparison means of said servo control loop and in said phase control signal generator, said phase comparator being selectively connected to said servo control loop and to said phase control signal generator by first and second switch means, each being controlled by a change-over singal fed thereto.

13. A head drum control circuit according to claim 12, in which said change-over signal has level transitions at the video signal field rate so that said phase comparator is connected to said servo loop and said phase control signal generator in respective alternate video fields.

14. A head drum control circuit according to claim 11, in which said attenuator includes means for attenuating an input signal to approximately ten percent of the original input value.

15. A head drum control circuit according to claim 11, in which said phase control signal generator includes an integrator for integrating the output of said subtractor means.

16. A head drum control circuit according to claim 15, in which said phase control signal generator further includes a switch means for connecting said reference time delay signal directly to said variable time delay means at the commencement of operation of the video tape editing apparatus.

17. A head drum control circuit according to claim 16, in which said level comparator in said phase control signal generating means is connected to receive said reference delay time signal at both inputs at the commencement of operation of said tape editing apparatus and upon operation of said switch means compares the reference time delay signal and said phase control signal thereafter.

* * * * *

UNITED STATES PATENT OFFICE
CERTIFICATE OF CORRECTION

Patent No. 4,528,603   Dated July 9, 1985

Inventor(s) Fumiyoshi Abe

It is certified that error appears in the above-identified patent and that said Letters Patent are hereby corrected as shown below:

First page, after line for item [22], insert the following:
    [30]    Foreign Application Priority Data April 2, 1981   Japan ...............49844/81

Signed and Sealed this

Twenty-first Day of January 1986

[SEAL]

Attest:

DONALD J. QUIGG

Attesting Officer     Commissioner of Patents and Trademarks